July 8, 1969 YEN T. HUANG 3,454,876

SPECTRAL ANALYSIS OF EVENTS OF FINITE RECORD LENGTH

Filed March 2, 1967 Sheet 1 of 2

INVENTOR
YEN TI HUANG

BY Alexander & Dowell

ATTORNEYS

INVENTOR
YEN TI HUANG
BY Alexander & Dowell
ATTORNEYS

United States Patent Office 3,454,876

Patented July 8, 1969

3,454,876

SPECTRAL ANALYSIS OF EVENTS OF FINITE RECORD LENGTH

Yen T. Huang, Dallas, Tex., assignor to Teledyne Industries, Geotech Division, a corporation of California Filed Mar. 2, 1967, Ser. No. 620,059
Int. Cl. G01r 23/16
U.S. Cl. 324—17 10 Claims

ABSTRACT OF THE DISCLOSURE

Spectral analysis is performed upon an analog trace of finite record length representing a non-repeating event, such as a seismic signature, by amplitude-sampling the record at regular increments along its significant length to express it in the time domain, performing a novel transformation upon this time-domain data to extract therefrom a finite spectrum comprising vectors expressing amplitudes and relative phases for various multiples of a fundamental frequency component whose period is selected equal to said significant record length, and then transforming these resultant vectors in the frequency domain into a finite series having a record length identical to the record length of the original trace. The disclosure includes apparatus for performing the spectral analysis and for performing filtering of undesired frequency components from the transformed spectral data.

It is the main object of this invention to provide a novel way of processing a complicated trace to analyze it and to obtain components with respect to which useful filtering can be performed. The processing is based upon the application of a "Numerical Transform Theorem" which can be used to transform a finite number of time-domain representations to a frequency-domain representation expressed as a finite number of harmonically related sinusoids, and vice versa. The invention is described with reference to the analysis of seismic signature records, where ordinary frequency domain filtering is quite unsatisfactory. The frequencies involved are very low, thus making LC filtering cumbersome. Moreover, it is impossible to provide such filters with sufficiently sharp cut-off characteristics. Various more sophisticated types of data processing have been tried, but have suffered from other disadvantages. For instance, Fourier Transforms theoretically require an infinite number of co-efficients to recover the original record. The application of the "Convolution Theorem" to digital filtering not only introduces undesirable transients into the record, but increases the original record length. Any changing or elongating of the record length is extremely undesirable in seismic data processing since recognition and evaluation of significant seismic events is based upon processing of record components at mutually-related instants of time among plural aligned signature traces. Therefore if the time scale differs from trace to trace, recognition of the first break or the first arrival of a seismic event when considering a number of signature traces would be very difficult.

It is therefore a major object of this invention to provide a way of analyzing a record of finite length, and for filtering the same without altering its record length. The performance of this object is accomplished by limiting the original record to a selected length adequate to express significant events, which record length is then made equal to the period of a frequency which, by hypothesis, represents the record's fundamental component. This selected record length is then quantized by sampling its amplitude at a large number of equally-spaced increments, which are deemed adequate to express the record detail and avoid omission of significant events. This amplitude sampling can be accomplished, for example, by well-known sample-and-hold techniques, as described hereinafter in connection with the drawings, such techniques being acknowledged as known in the prior art, for istance in Burns et al. P.S. Patent 3,209,250. Next, the resulting amplitude data is analyzed in a novel way to transform it into polar-coordintaed vectors giving the amplitudes and relative phases of the fundamental (assumed) frequency and certain of its multiples, using as many multiples as are required, according to the techniques described hereinafter. In an article published by Y. T. Huang in the Bulletin of the Seismological Society of America (vol. 56, No. 2, pages 425–440, April 1966), there is described a "Numerical Transform Theorem" which is a reversible relationship for transforming between the above-mentioned spectrum of vectors in the frequency domain and sampled amplitude representations in the time domain. This relationship indicates that the recovery of the sampled amplitude data ($f_i$) from the vector representations is possible without consuming an infinite number of frequency coefficients. The Numerical Transform relationship is as follows:

$$f_i=\frac{1}{m}\sum_{n=0}^{m-1}\sum_{k=0}^{m-1}f_k e^{-j(2\pi n/m)(k-i)} \quad (1)$$

where $m$ is the number of sampled amplitude values, $n$ is the number of a particular frequency component, $i$ is the number of a particular amplitude value, $k$ is an integer representing multiples of the sampling increment, and $f_k$ is the corresponding sampled amplitude value. The numerical Fourier coefficients $a_n$ (symmetric part) and $b_n$ (anti-symmetric part) can be expressed as the vector coefficient $c_n=\frac{1}{2}[a_n-jb_n]$. When this is done, the above-expressed Numerical Transform Theorem can be broken down into:

$$f_i=\sum_{n=0}^{m-1}c_n e^{j(2\pi ni/m)} \quad (2)$$

$$c_n=\frac{1}{m}\sum_{i=0}^{m-1}f_i e^{-j(2\pi ni/m)} \quad (3)$$

When it becomes desirable to transform polar vectors from the frequency domain back into amplitude values $f_i$ in the time domain, assuming that each such vector in the frequency domain has an amplitude $\rho_n$ and a phase angle $\theta$, then each complex coefficient $c_n$ can be determined using the relationships: $a_n=\rho_n \cos\theta_n$, and $$b_n=\rho_n \sin\theta_n$$

Now since each coefficient $c_n$ represents either the (assumed) fundamental frequency (i.e., the reciprocal of the selected record length), or a multiple thereof, filtering of the record to eliminate undesired frequency components can be efficiently accomplished by omitting corresponding coefficients from the above Numerical Transform relationship. This technique can provide filtering having infinitely steep cut-off characteristics. Moreover, it eliminates spurious components commonly introduced by other filtering techniques, and can be easily accomplished employing techniques and apparatus as set forth hereinafter. Moreover, different weighting of the various frequently components before transformation back into a representation in the form of amplitude values may be accomplished to advantage as a further form of filtering.

Another major object of this invention is to provide apparatus for carrying out the above-discussed processing steps to obtain sampled amplitude value representations which can be either filtered or stacked with other related data to obtain enhancement of significant events, or which can be recombined to obtain an analog trace representing filtered information processed as set forth above.

Other objects and advantages of the present invention will become apparent during the following discussion of the drawings, wherein.

Figures 3, 4, 5:
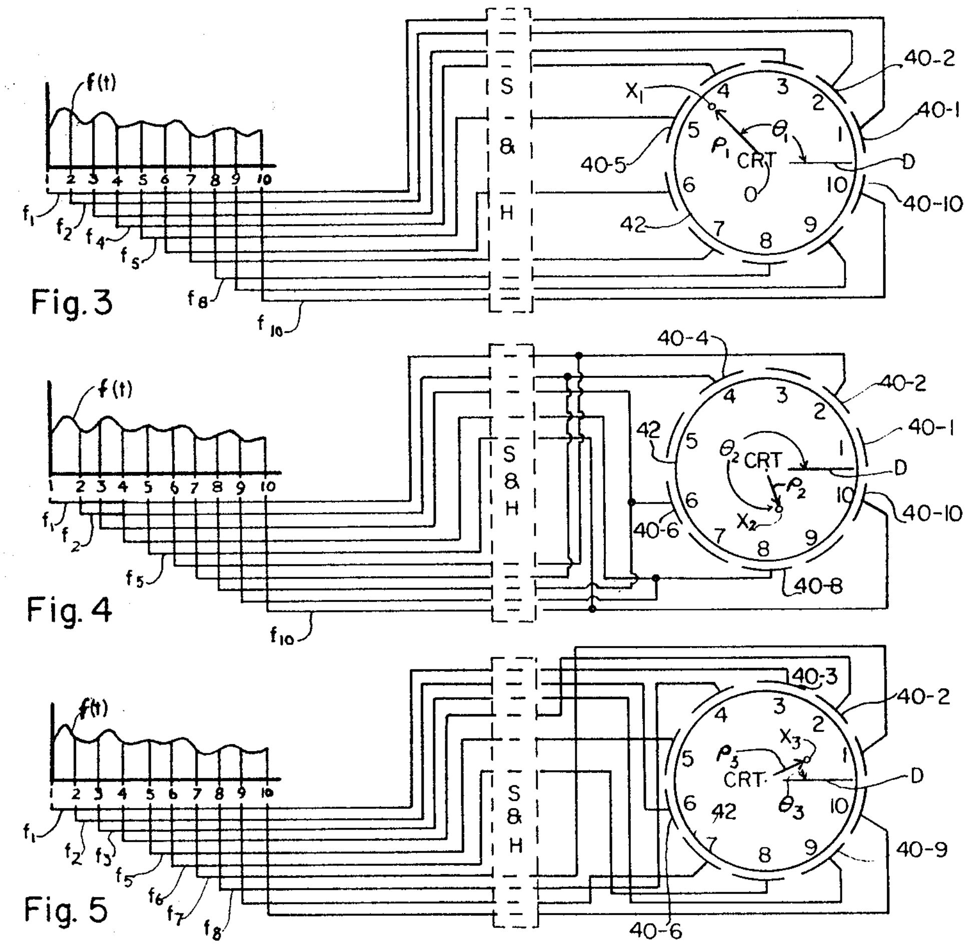
FIG. 3 is a simplified diagram illustrating the connections used to obtain the amplitude and phase angle of the fundamental frequency vector component, i.e., where $n=1$.
Figure 6:
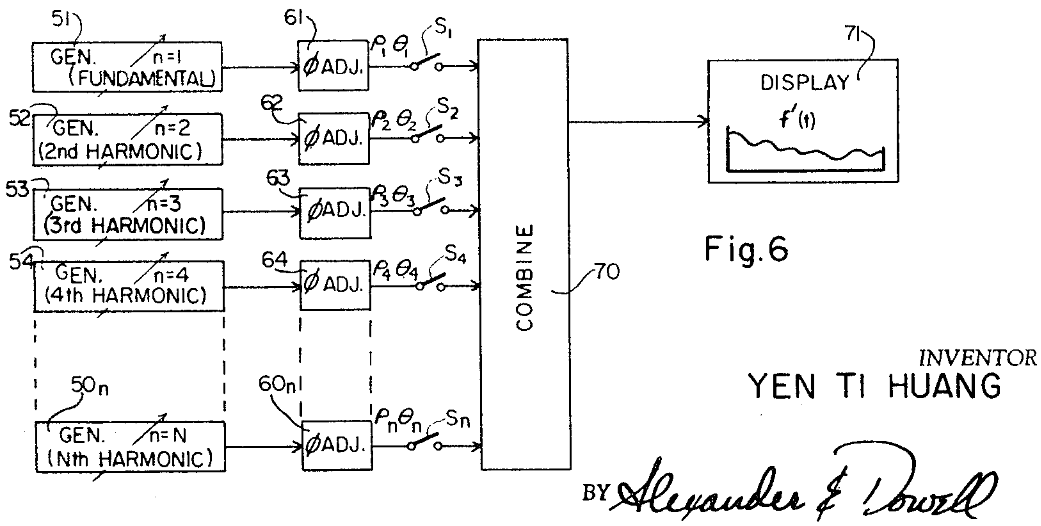

FIGS. 4 and 5 are diagrams similar to FIG. 3 but showing different connections used to obtain the amplitudes and relative phase angles respectively of the second harmonic ($n=2$), and the third harmonic ($n=3$); and FIG. 6 is a block diagram illustrating apparatus which can be used to recover the envelope of the previously amplitude-sampled function and which can be used to perform frequency-domain filtering by weighting selected harmonic multiples of the fundamental frequency component.

Figure 1:
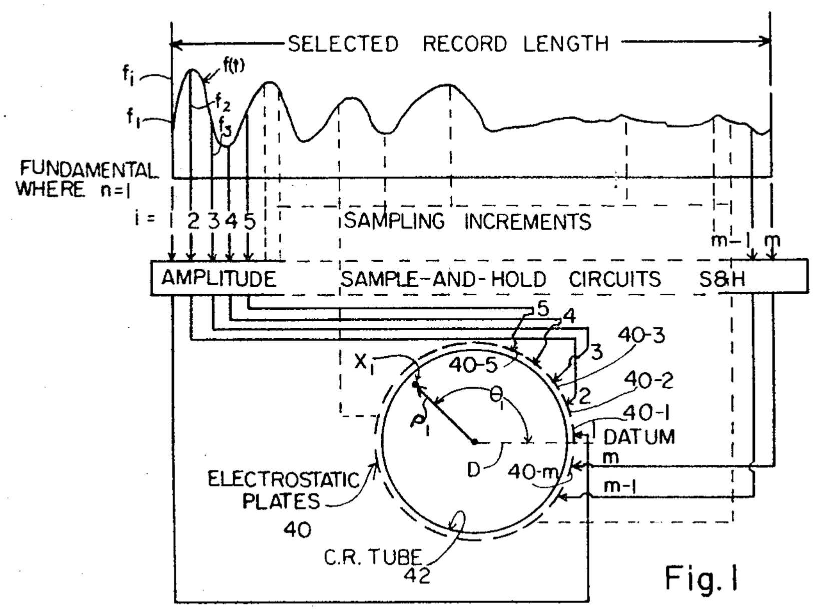
FIG. 1 is a diagram illustrating the amplitude sampling of a function $f(t)$, and the analyzing of the resulting incremental values to extract a spectrum therefrom representing the amplitudes and phases of $n$ frequency components which are representative of the sampled series.

Referring now to FIG. 1, the present invention will be described with reference to the processing of a seismic signature, the significant portion of which has a finite record length and does not repeat. Analyses based on Fourier series are basically periodic in nature and therefore since the present seismic record length is finite, and in fact quite brief in duration, truncation is necessary. To accomplish truncation in a satisfactory way this disclosure treats the selected seismic record length as being one cycle of a fundamental frequency component, so that the record length is equal to the reciprocal of the period of the (assumed) fundamental frequency. In other words, the selection of the record length establishes the fundamental frequency of the components which will be used to represent the record. This is the first step, i.e., to select the record length.

Next the record $f(t)$ is quantized by sampling amplitude values over the entire record length at spaced intervals $i$, there being a total of $m$ such values taken. These values are each denoted by the notation $f_i$, so that the first sample is $f_1$, the second is $f_2$, and so on. The interval $i$, and therefore the sampling rate, is assumed for present purposes to be adequate to express sufficient details of the original record function $f(t)$ to implement the purpose of the record analysis being performed. For the purpose of processing seismic traces a few hundred sample values taken from a record length of, for example, four or five seconds adequately represents the significant information contained in the record. One-half the sampling rate determines the so-called "folding" frequency. For a record length of four seconds and $m=200$ samples, the folding frequency is ½(200/4)=25 c.p.s. When representing the sampled time-domain data as a spectrum in the frequency domain, or vice versa, a sufficient number of multiples or harmonics of the fundamental frequency must be included so that the highest multiple is equal to the folding frequency, or nearly so.

Figure 2:
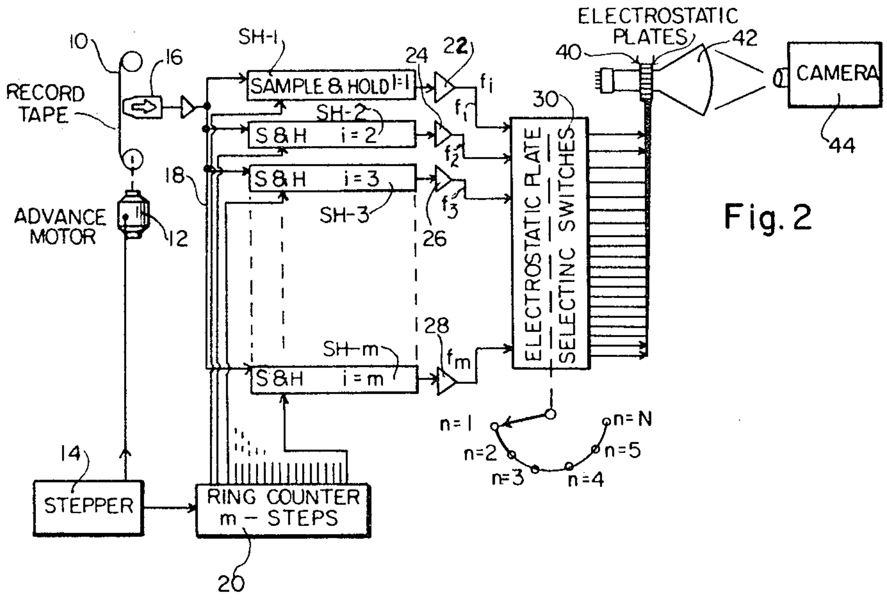
FIG. 2 is a block diagram showing apparatus for obtaining said incrementally sampled values, and transforming them into amplitude and phase vectors.

There are a number of different ways to amplitude-sample a record $f(t)$, FIGS. 1 through 5 illustrating the use of sample-and-hold circuitry SH for converting each amplitude value $f_i$ into a voltage proportional to the amplitude at the sampling interval $i$. The block diagram of FIG. 2 shows more specifically a system for accomplishing this purpose. Suppose for example that the seismic record $f(t)$ of FIG. 1 is recorded on a carrier medium 10, such as a magnetic or photographic tape, which carrier is advanced through the increments $i$ by a motor 12 which is driven by output synchronized with stepper means 14. The carrier tape 10 is thus advanced past a reading head 16 which reads the amplitude of the recorded function $f(t)$ at each increment and delivers an output voltage to the wire 18 through a suitable amplifier. The stepper 14 also advances a ring counter 20 which has as many outputs as there are sampling increments in the record $f(t)$, namely $m$ outputs. These outputs are connected to sequentially enable a plurality of sample and hold circuits, SH–1, SH–2, SH–3 to SH–$m$, whereby each successive incremental amplitude which is read by the head 16 is sampled and held in a different SH circuit corresponding with the incremental position of the sample taken from the seismic record $f(t)$. When all $m$ incremental amplitudes have been sampled and held, their values are simultaneously available at the outputs of amplifiers 22, 24, 26 . . . 28, and these outputs are connected to a switching device 30 which is a part of a spectrum analyzing system, to be more fully described hereinafter. The sequence of all of these amplitude values taken at successive increments $i=1, 2, 3, 4 \ldots m$ comprises a quantized representation of the original seismic record $f(t)$ and for present purposes, as stated above, it is assumed that the original function $f(t)$ is adequately represented in the time domain by this series of amplitude values.

The next step is to spectrum analyze this time domain series, and according to an important novel feature of the present invention this analysis of time domain data is performed in such a way as to obtain a spectrum of vectors $c_n$ representative thereof in the frequency domain. According to the "Numerical Transform Theorem" referred to above, and in the article appearing in the Bulletin of the Seismological Society of America, there is an exact relationship between the finite record expressed in the time domain as sampled amplitude values $f_i$, and the record expressed in the frequency domain as $c_n$ multiples of the fundamental frequency: i.e., $c_1$ of amplitude $\rho_1$ and phase $\theta_1$, the second multiple $c_2$ of amplitude $\rho_2$ and phase $\theta_2$ . . . up to frequency $c_n$ of amplitude $\rho_n$ and phase $\theta_n$. The relationship is defined as:

$$f_i=\sum_{n=0}^{m-1} c_n e^{j(2\pi n i/m)}$$

and $$c_n=\frac{1}{m}\sum_{i=0}^{m-1} f_i e^{-j(2\pi n i/m)}$$

where $$c_n=\frac{1}{2}[\rho_n \cos\theta_n - j\rho_n \sin\theta_n]$$

The spectral analysis is performed according to the following formulae. The component vectors are: the fundamental $$c_1=\frac{1}{m}\sum_{i=0}^{m-1} f_i e^{-j(2\pi i/m)}$$

and $$c_2=\frac{1}{m}\sum_{i=0}^{m-1} f_i e^{-j(4\pi i/m)}$$

and $$c_3=\frac{1}{m}\sum_{i=0}^{m-1} f_i e^{-j(6\pi i/m)}$$

, etc.

Since $f_i$ are sampled amplitude values, a switching device 30, FIG. 2 can be used to dispose these amplitude values in an annular arrangement so that forces proportional to all these amplitude values are summed to displace a point from the center of the annular arrangement to a position representing the resultant of the amplitude forces and to an angular polar-coordinate position representing a phase position, thereby producing a vector $c_n$ representing the relative magnitude $\rho_n$ of the resultant field and its phase angle $\theta_n$. The present disclosure illustrates this deflection by locating $m$ electrostatic plates 40–1 to 40-$m$ about a cathode ray tube 42 so that when all of the sampled values $f_1$ to $f_m$ are applied to the plates 40 there will be established a resultant CRT beam-deflecting field which will move the spot $X_n$ of the CR tube 42 to a position whose deflection from the center of the tube is equal to the resultant amplitude value $\rho_n$ of a certain coefficient component in the frequency domain and whose polar position with respect to the datum line D passing through the center of the electrostatic plate 40–1 indicates the phase angle position $\theta_n$ of that frequency component.

The switching device 30 is necessary to selectively connect the amplitude samples $f_i$ to the cathode ray tube deflection plates 40 in order to extract different vectors $c_n$ to represent each of the necessary multiples of the fundamental, each multiple requiring different connections of the sampled amplitude values $f_i$ to these plates. FIGS. 3, 4, and 5 show simplified diagrams of various connections made of the amplitude values $f_i$ to the plates 40, these figures omitting the switching device for the sake of clarity. As an illustration of the principles involved, it has been assumed in connection with FIGS. 3, 4, and 5 that only ten samples are taken, therefore requiring only ten plates 40–1 through 40–10 around the cathode ray tube 42. FIG. 3 shows the interconnection of the amplitude samples $f_i$ with the plates 40 (by the switching device 30, not shown) for the purpose of transforming the sampled data $f_i$ to obtain therefrom the phase $\theta_1$ and amplitude $\rho_1$ of the vector $c_1$ representing the fundamental frequency component where $n=1$. FIG. 4 shows another interconnection of the amplitude samples $f_i$ with the plates 40 to obtain the phase $\theta_2$ and the amplitude $\rho_2$ of the vector $c_2$ representing the second multiple or harmonic where $n=2$. FIG. 5 shows still another interconnection of the amplitude samples $f_i$ with the plates 40 to obtain the phase $\theta_3$ and the amplitude $\rho_3$ of the third multiple or harmonic where $n=3$. These connections shown in FIGS. 3, 4, and 5 can be made by hand, the switching device 30, FIG. 2, being shown only as a convenience in a practical analyzer. It would be desirable in the latter event to program the switching device 30 not only to automatically switch the various amplitude samples $f_i$ with respect to the plates 40, but also to weight the various vector components according to a predetermined filtering plan.

To obtain the amplitude $\rho_1$ and the relative phase $\theta_1$ of the fundamental vector $c_n$, the outputs from the sample-and-hold circuits SH are connected in sequence to each plate 40 around the CR tube 42, as shown in FIG. 3. Thus, sample $f_1$ connects to the plate 40–1, starting at the datum line D. Sample $f_2$ connects to the next plate 40–2, and so on sequentially until the last sample $f_{10}$ has been connected to the last plate 40–10, the number of plates around the CR tube being equal in this example to the total number of samples $f_i$ which are taken.

When all of the plates 40 as shown in FIG. 3 are simultaneously energized by the successive samples $f_1$ through $f_{10}$, their combined electrostatic fields will deflect the spot $X_1$ from the center 0 of the CR tube, and this deflection in terms of polar coordinates $\rho_1$, $\theta_1$ defines the vector $c_1$ and $\theta_1$ can be conveniently recorded on a camera 44, FIG. 4, or they can be visually observed on a graduated face overlying the screen of the CR tube.

To obtain the amplitude $\rho_2$ and the relative phase $\theta_2$ of the second multiple vector $c_2$ the samplings $f_i$ have to be reconnected to the plates 40–1 through 40–10 as shown in FIG. 4. However, in this case the first sample $f_1$ is connected to the second plate 40–2, the second sample $f_2$ is connected to the fourth plate 40–4, and so on until sample $f_5$ is connected to the last plate 40–10. This same sequence is continued, i.e., skip the next plate after 40–10 and connect sample $f_6$ to the plate after it. Thus $f_6$ connects to plate 40–2, $f_7$ connects to 40–4, and so on. It happens in this configuration that the odd-numbered plates are unused. Now, when all connections are energized, according to the Numerical Transform set forth in Formula 1 where $k=2$, the spot $X_2$ will be deflected by the resultant electrostatic field to a position $\rho_2$ $\theta_2$ where $\rho_2$ represents the amplitude of the second multiple vector $c_2$ and $\theta_2$ represents its relative phase position.

To obtain the amplitude $\rho_3$ and the relative phase $\theta_3$ of the third multiple vector $c_3$ of the fundamental, the quantized samples $f_i$ have to be reconnected in still another way to the plates 40 as shown in FIG. 5. In this case the value $k$ in Formula 1 will be set equal to 3 and the first sample $f_1$ connected to the third plate 40–3; the second sample $f_2$ connected to the sixth plate 40–6; the third sample $f_3$ connected to the ninth plate 40–9; the fourth sample $f_4$ connected by skipping two plates after 40–9 and connecting to plate 40–2. The sample $f_5$ connects to plate 40–5, and so on until all samples have been connected to appropriate plates, skipping two plates after each connection. The resulting position of the deflected spot $X_3$ gives an amplitude of $\rho_3$ and a phase $\theta_3$ for the third harmonic of the selected fundamental.

This process of reconnecting the samples $f_i$ and reading the $\rho_n$, $\theta_n$ data from the CR tube is continued at least until the frequency of the last harmonic component analyzed is as great as the folding frequency, which equals ½ the sampling rate. In a practical system it is convenient to photograph successive dot positions superimposed on the same film to provide a composite polar-coordinate spectrum of $\rho_n$, $\theta_n$ corresponding with the sampled data.

The number of plates around the CR tube need not necessarily be equal to the total number of samples $f_i$, or vice versa. Where there are $m$ samples, but a different number $m'$ of plates, spectral analysis can still be performed by applying the $m$ samples to the available plates. In other words, it is a special case where the number of samples corresponds exactly with the number of plates.

This sampled data can be recovered mathematically increment-by-increment and plotted as shown to the right in FIG. 6 to provide an envelope $f'(t)$ for the sampled data series, but FIG. 6 also shows another way of converting the spectrum $\rho_n$, $\theta_n$ back into the representation of the envelope $f'(t)$. By using signal generators 51 through 50$_n$ and adjusting their respective output amplitudes to $\rho_1$, $\rho_2$, $\rho_3$ . . . $\rho_n$; and by also adjusting their respective phases, by phase adjusters 61 through 60$_n$, to equal $\theta_1$, $\theta_2$, $\theta_3$ . . . $\theta_n$; and then by combining all of these components $\rho_1$ $\theta_1$, $\rho_2$ $\theta_2$, $\rho_3$ $\theta_3$ . . . $\rho_n$ $\theta_n$ there is obtained an output from the combining means 70 and the display device 71 a representation of the function $f'(t)$, without changing its record length as compared with the length of the original record $f(t)$, although the function $f'(t)$ actually does repeat periodically beyond the end of the record length. As pointed out above, various adjustments (weighting) of amplitude and/or phase can be made to accomplish various data processing objectives, such as filtering.

Referring still to FIG. 6 the row of switches S–1 S2, S3, S4 . . . $S_n$ illustrates how filtering can be performed during recovery of the envelope $f'(t)$. In an actual example involving the analysis of a seismic signature, it is usually discovered that there are only a small number of frequency components having significant amplitudes, even after considerable electronic amplification of the trace. For instance, there might be significant components at 0.5 c.p.s., 0.75 c.p.s., 1.25 c.p.s., and 3 c.p.s., and only a few others which can be even noticed. When the signature envelope $f'(t)$ is recovered using FIG. 6, the four switches S corresponding to these components will be closed and all others left open, with the result that selective filtering has been performed to eliminate noise while retaining important events. This provides an additional operating technique sometimes referred to as "character filtering," which can be used in combination with data stacking or correlation techniques to enhance significant events among aligned seismic records. Data stacking can be conveniently accomplished by taking plural aligned records of equal length and sampling them, using the same sampling rate, to obtain corresponding amplitude samples. These corresponding samples are respectively added together, i.e., stacked, to obtain a composite series of amplitude signals. Then the composite series is transformed by using Formula 3 to obtain vectors representing the amplitudes and phases of the fundamental frequency and its harmonics.

It may also be useful to vary the originally selected record length somewhat to obtain differing fundamental frequencies and/or different total numbers $m$ of samples, so as to determine which of the resulting spectral analyses will yield the best data. A similar varying of the initially assumed conditions can be had by varying the sampling rate to determine which rate yields the best final results.

For a record of finite length, the present technique of processing sampled data introduces periodicity, namely periodically repeating images beyond the selected record length. When the number of deflection points $m'$ is greater than the number of samples $m$ and the resolution is sufficiently small, the periodic images will have "tails of zero ordinates" for a distance of $(m'-m)$ multiplied by the sampling increment. It is only when the fundamental frequency is reduced to zero that a true aperiodic function will be obtained in the time domain. Conversely, when $m$ is larger than $m'$, the spectral analysis obtained by the present annular arrangement of radial forces will give a spectral average of repeating record images. This property can be applied to techniques of data stacking and signal enhancement by sampling plural related records arranged in series. Analogous to data stacking used in exploration geophysics, this spectral average may be called a "stacked spectrum." As a particular case, Fourier coefficients can be obtained by Fourier transforms when the fundamental frequency is taken equal to the inverse of the record length.

There are, of course, many possible modifications of the apparatus shown in these drawings, for instance, multiple CR tubes can be used with their respective electrostatic plates all wired permanently to the sample-and-hold circuits so that each CR tube shows $\rho$, $\theta$ for a different harmonic component $c_n$. Moreover, magnetic yoke deflection can be used instead of electrostatic. Even a pneumatic system can be used in which jets of air are directed inwardly from annularly spaced nozzles to deflect a reference point according to the resultant of the various jet velocities. Undoubtedly, there are other practical embodiments of an annular vector-extracting apparatus which can be used for the purpose of arranging a ring of radially-acting forces each representing a sampled amplitude and these forces together establishing a resultant force-field within the ring to deflect a normally centered point and thereby indicate the amplitude and phase of a polar-coordinate vector representing the fundamental frequency component or a multiple thereof. The degree of resultant deflection can be greatly amplified using cathode-ray, or optical, projecting techniques.

For the sake of simplifying the explanations, the method and apparatus disclosed above have been confined to a discussion relating to filtering in only one dimension, but ther is no need for such a restriction when applying these techniques to a practical problem. The Numerical Transform Theorem can be similarly applied to two, three, four, etc., dimensions in space and time, and filtering can be likewise accomplished by modifying the respective expressions to appropriately weight the resulting vector components. The mathematical formulas corresponding with (1), (2) and (3), supra, become more complex because of the inclusion, for each different dimension, of additional expressions whose forms however correspond with those set forth above except that different letters are used to refer to and represent the additional dimensions. The record length is still equal to the sampling increment multiplied by the number of samples taken.

This invention is not to be limited to the described examples and illustrations shown in the drawings, for obviously changes may be made within the scope of the following claims.

I claim:

1. The method of processing the waveform record of an event of finite duration, including the steps of:

(a sampling the record to obtain a time-domain representation comprising a series of amplitude samples taken at regular increments along the whole significant record length; and (b) transforming the series of samples into a representative spectrum of frequency-domain vectors by applying at spaced points around a circle radially acting forces respectively proportional to the samples in said series to develop a field of forces within the circle; measuring with respect to a datum the polar coordinates of the resultant of said forces, which coordinates represent the amplitude and phase of a fundamental frequency component of period proportional to said record length; and re-applying the same radial forces around the said points of the circle with different annular spacings while repeating said measurements to obtain different vectors each representing a different component comprising a multiple of said fundamental frequency, the angular spacings between the points to which the forces are applied and the displaced position of the point to which the first force is applied with respect to said datum being increased each time by a factor proportional to the multiple of the harmonic whose vector is being measured.

2. The method as set forth in claim 1, wherein said vectors $c$ representing the fundamental and each of the $n$ multiple components is transformed according to the formula $$c_n=\frac{1}{m}\sum_{i=0}^{m-1} f_i e^{-j(2\pi ni/m)}$$

where $j$, $e$, and $\pi$ have their usual mathematical meaning, $m$ is the number of incremental samples, $i$ is the number of a particular sample, and $f_i$ is the amplitude of the $i$th sample.

3. The method as set forth in claim 1 wherein the $n$th multiple transformed is at least as high as the folding frequency which is defined as one-half the incremental sampling rate.

4. The method as set forth in claim 1, including the steps of establishing a minimum threshold for said amplitudes, and recombining the spectral components whose amplitudes exceed that threshold by adding together the components according to the relative amplitudes and phases as defined by said spectrum to recover a waveform having periodically repeating cycles each equal to said significant record length.

5. The method as set forth in claim 1, including the steps of selectively filtering in the frequency domain by weighting selected components, and recombining the weighted components by adding them together according to their respective amplitudes and phases to recover a filtered waveform having periodically repeating cycles each equal to said significant record length.

6. The method as set forth in claim 1, including the steps of recombining the spectral components by adding them together according to the relative amplitudes and phases as defined by said spectrum to recover a waveform having periodically repeating cycles each equal to said significant record length.

7. In the method as set forth in claim 1, the step of recovering amplitude samples $f$ representative of said waveform from said spectrum which includes $n$ fundamental and multiple sinusoid components respectively having amplitudes $\rho_n$ and relative phases $\theta_n$, according to the following formula $$f_i=\sum_{n=0}^{m-1}\frac{1}{2}[\rho_n \cos \theta_n - j\rho_n \sin \theta_n]e^{j(2\pi ni/m)}$$

where $j$, $e$, and $\pi$ have their usual mathematical meaning, $m$ is the number of incremental ampltiude samples, and $i$ is the number of a particular sample.

8. The method as set forth in claim 1, including sampling the record length to obtain a lesser number of amplitude samples than there are points around said circle, and applying radially acting forces representing said samples to as many points as there are samples to obtain a Fourier Transform polar-coordinate spectrum.

9. The method as set forth in claim 1, including the steps of placing plural records concerning related events adjacent to each other, and continuously sampling their amplitudes as though the records represented repeating cycles; and transforming the resulting amplitude samples into frequency-domain vectors by applying radially-acting forces representative thereof continuously around the points of said circle to achieve "stacking" of said records.

10. Apparatus for processing a waveform representing the record of an event of finite duration equal to the period of an assumed fundamental frequency component thereof, comprising:

(a) means for sampling the waveform at regular intervals over its length to obtain a series of amplitude values representative thereof;

(b) an annular series of uniformly spaced deflection means surrounding a displaceable indicator means;

(c) means for connecting said values to energize the respective deflection means in proportion to said sampled amplitudes to produce radially-acting forces proportional to the respective values, and thereby deflect said indicator means through a distance whose magnitude and direction are determined by the resultant of said forces, the magnitude and direction determining a vector representing said fundamental frequency component; and (d) means for reconnecting said values to different ones of said deflection means to determine a vector representing the $n$th multiple component of said frequency, each reconnection applying the first amplitude value of the $n$th deflection means and the remaining values to subsequent deflection means each time skipping $(n-1)$ intervening deflection means.

References Cited

UNITED STATES PATENTS

| | | |
|---|---|---|
| 2,540,660 | 2/1951 | Dreyfus. |
| 3,162,808 | 12/1964 | Haase. |

RUDOLPH V. ROLINEC, *Primary Examiner.*

P. F. WILLE, *Assistant Examiner.*

U.S. Cl. X.R.

179—1; 340—15.5